Dec. 30, 1941.  M. VON ARDENNE  2,267,769
MICROSCOPE FOR ULTRAVIOLET LIGHT
Filed April 8, 1939  2 Sheets-Sheet 1
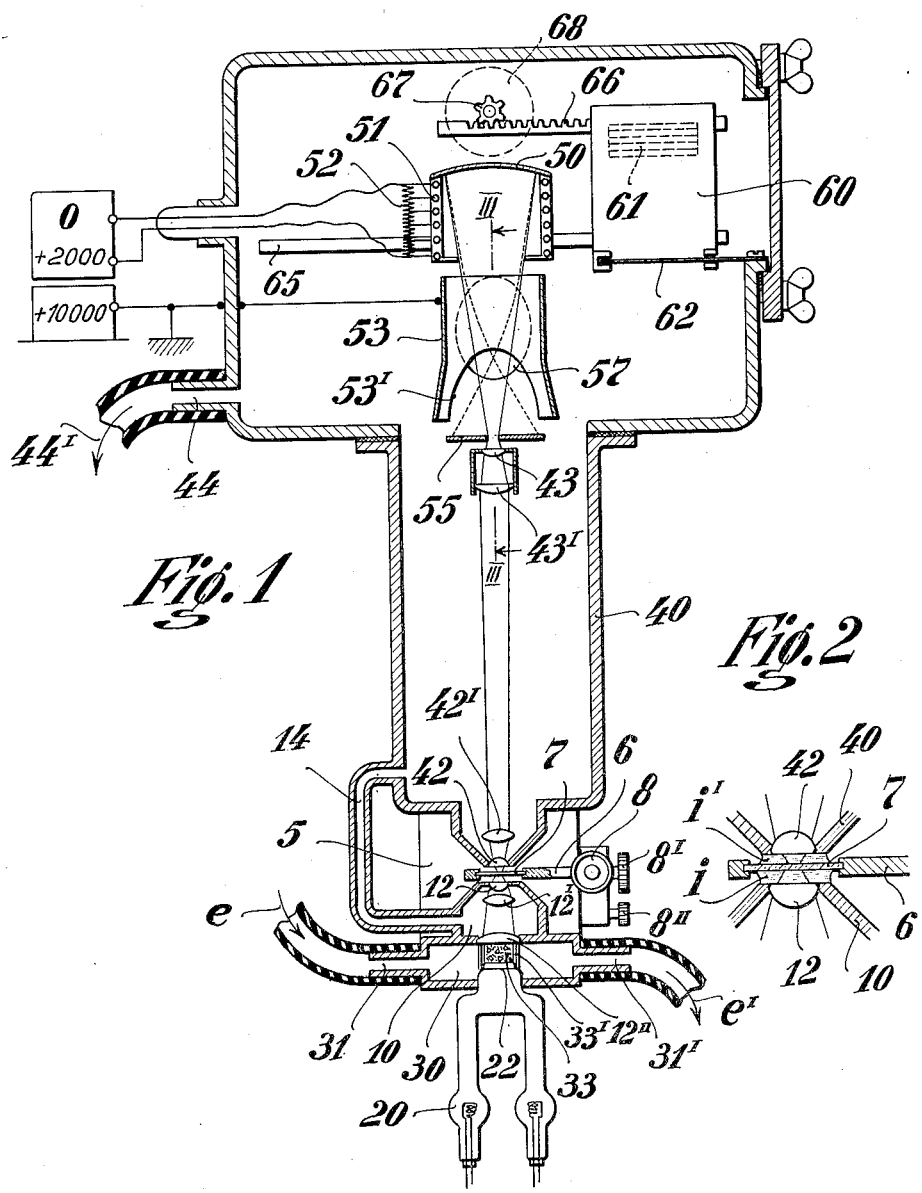
INVENTOR
Manfred von Ardenne
BY
Karl Viertel
ATTORNEY

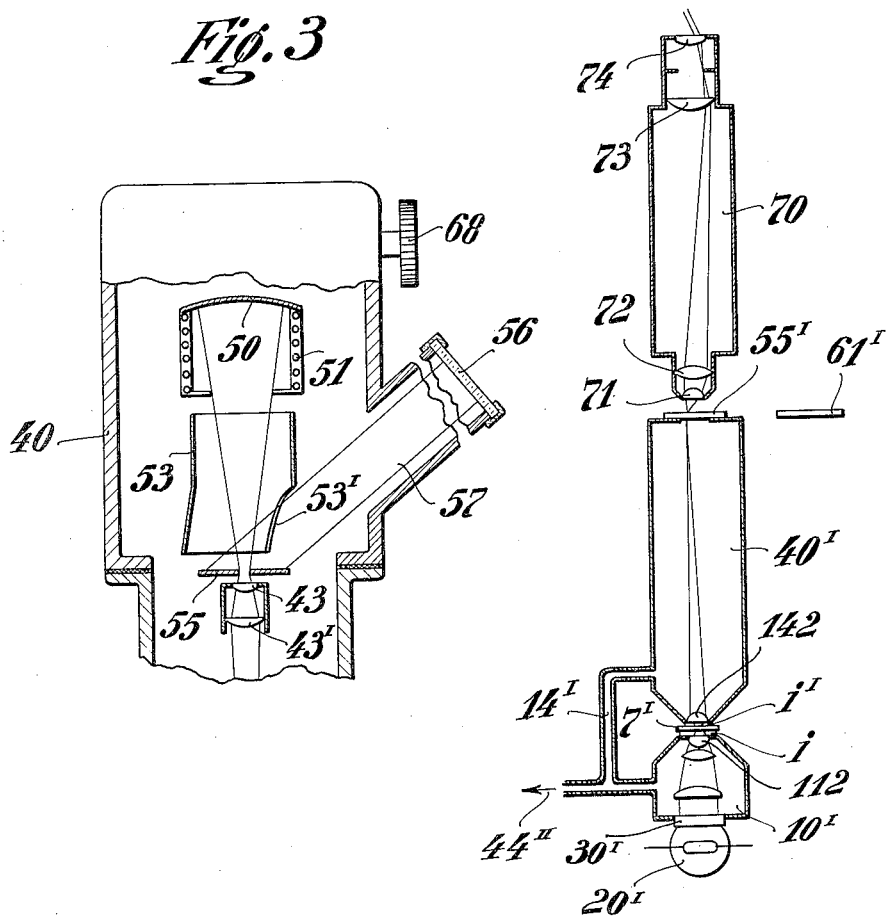

Patented Dec. 30, 1941

2,267,769

UNITED STATES PATENT OFFICE 2,267,769

MICROSCOPE FOR ULTRAVIOLET LIGHT

Manfred von Ardenne, Berlin-Lichterfelde, Germany

Application April 8, 1939, Serial No. 266,905
In Germany April 13, 1938

7 Claims. (Cl. 250—49.5)

My invention relates to improvements in light microscopes, and more especially to the problem of considerably increasing the resolving power or rate of magnification obtainable by light microscopes over and beyond the limits inherent to the most powerful compound microscopes known in the art including those using ultra-violet light.

As a matter of fact microscopes using ultra-violet light—hereinafter briefly called ultra-violet microscopes—although having been invented more than 30 years ago and having been improved in the meantime are not used much in practice because of presenting some serious drawbacks.

Focusing the instrument is very difficult, because the magnified image is not directly visible to the observer, but can be made visible only by taking photographs of it; moreover the light intensity of the magnified image is very limited.

The working wave length used in ultra-violet microscopes known heretofore is about 2750 Angström units,—abbreviated A. U. hereinafter—that is only half that of the maximum sensitiveness of the human eye (5500 A. U.), a feature through which the resolving power of the instrument is restricted to only two times of that of conventional or ordinary light microscopes.

As a matter of fact the resolving and magnifying power of ultra-violet microscopes known in the art is inadequate in practice and does not justify their rather complicated manipulation and the use of elaborate and costly accessorial equipment including an apparatus for producing electric spark light and a monochromator.

The principal object of this invention is to overcome the aforedescribed drawbacks inherent to ultra-violet microscopes known heretofore.

One of the outstanding features of the ultra-violet microscope re-designed according to this invention consists in the selection of a shorter working wave length than used heretofore ranging near the limits of perviousness of pure calcium-fluorite—the shortest usable wave length permeating therethrough being about 1250 A. U.—or of other appropriate substances, preferably minerals, which are pervious to waves within the same range, and which afford a highly accurate trimming of their optically relevant surfaces; namely it has been found, that the increased resolving power aimed at by this invention calls for higher accuracy in trimming the surfaces of the monochromatic lenses to be used in the instrument, and that calcium-fluorite is a mineral suitable for making lenses presenting highly accurate surfaces.

Because of using for the purposes of this invention a selected specific working wave length ranging near the limits of perviousness of fluorite,—namely 1250 A. U. as against 5500 A. U. presenting the maximum sensitiveness of the human eye—the improved microscope has a higher resolving power exceeding four times that of ordinary light microscopes.

Another equally important feature of the invention is the provision of closed vessels or containers within which the optically relevant parts of the instrument are enclosed, and of means for evacuating the air from said containers; to wit: Atmospheric air is absolutely impervious to wave lengths of the range concerned, namely which are below 2000 Angström units, and lie within the so-called "Schumann"-Violet.

Another salient feature of the invention intimately connected with the application of containers from which the air is withdrawn consists in the provision of an electron-image tube in the evacuated instrument responsive to ultra-violet light rays and of a fluorescent screen, by which the magnified yet invisible image produced is converted into an image directly visible to the observer.

In this way the focusing of the instrument is greatly facilitated and the operator will be free to select at ease a specific characteristic section of the object under observation before taking photographs of it.

Still other valuable features of the ultra-violet microscope re-designed according to this invention consist in that the object carrier is arranged outside the said evacuated containers in a specific position thereto so chosen, that the object can be easily put into and removed from its place and will closely fit therebetween after having been coated on both sides with an adhesive substance such as acetonic acid pervious to ultra-violet light and absorbing only a negligible proportion of it.

By using said expedient of coating the upper and lower side of the object with a substance of the nature concerned an uninterrupted track or course characterized by the absence of air and running exclusively through media and spaces pervious to ultra-violet light rays of the working length selected is provided.

Last not least the invention aims at providing improved and powerful means for producing ultra-violet monochromatic light of the working wave length selected for highly illuminating the object from below.

Ultra-violet microscopes designed with the objects in view outlined above are diagrammatically shown by way of examples on the enclosed drawings, in which Fig. 1 is a section vertically taken through an ultra-violet microscope re-designed according to this invention;

Fig. 2 is a fragmentary section showing in a larger scale the object carrier and adjacent parts of the instrument;

Fig. 3 is a fragmentary section taken vertically through the upper part of the instrument on line III—III in Fig. 1;

Fig. 4 is a layout diagrammatically showing a structurally modified ultra-violet microscope re-designed according to this invention.

The microscope diagrammatically shown in Figs. 1 to 3 comprises:

(1) A support 5, a stage 6 for carrying the object under observation 7 and being adjustably fixed on said support by means of screw and nut gears and a rack and pinion gear of conventional design, indicated at 8, 8', 8'';

(2) means for producing monochromatic light of a relatively short wave length, ranging below the perviousness of air (2000 A. U.) and illuminating the object 7 thereby; in the embodiment of the invention shown by way of an example in Fig. 1 said light producing and object illuminating means include:

(a) A vacuum-tight (primary) container 10 apertured at opposite ends thereof and sealed by a condenser lens which is composed of a system of individual lenses 12, 12', 12'' preferably made of calcium fluorite; the upper lens 12 is opposed to the lower side of the object 7 and is spaced therefrom by a relatively narrow gap bridged over by a coating $i$ of a translucent and highly cohesive liquid having substantially the same refraction index as calcium fluorite and being hereinafter briefly called "immersion" liquid;

(b) means for withdrawing the air from said primary container 10 including a communication tube 14 connecting said primary container 10 with a secondary vacuum-tight container 40 referred to hereinafter, and another tube 44 connecting said secondary container with an air pump not shown;

(c) an electric vacuum discharge tube 20 preferably filled with xenon-gas under low pressure hereinafter briefly called xenon-tube and connected with a source of alternating current of high voltage not shown; said xenon-tube has an emission window 22 facing the lower condenser lens 12'' and being preferably made of calcium fluorite;

(d) filter means arranged between said xenon-tube 20 and said condenser lens 12'', which include (1) a receptacle 30 formed at said primary container 10 and having intake and discharge ports 31, 31' and an aperture closed by said xenon-tube; (2) a layer 33 of fragments of calcium fluorite loosely assembled in the space between the emission window 22 of the xenon-tube and the lower condenser lens 12'', and kept together by a perforated cylindrical shell 33', and (3) a liquid cooling agent having substantially the same refractive index as calcium fluorite and being circulated therethrough by appropriate means diagrammatically indicated by arrows $e, e'$.

It has been found in the course of the inventor's experimental and research work that acetonic acid kept at uniform temperature by a temperature controlling device of conventional design—not shown— is an appropriate cooling agent and an equally useful suitable "immersion" liquid referred to above, for coating the object 7 on its upper and lower side for the purposes of this invention explained in greater detail hereinafter.

It has further been found, that by using a xenon-tube and throwing the light produced by same through a filter of the type described, known per se in the art as "Christiansen" filter, highly intense monochromatic light having a wave length of 1469 A. U. is selected referred to hereinbefore as the "working" wave length of the instrument.

(3) Means for producing a magnified image of the illuminated object 7 are arranged coaxially to the condenser lens described, which include:

A secondary vacuum-tight container 40 arranged in opposed position to the primary container 10 and having an aperture facing the object 7,— a large apertured objective lens composed of two or more individual lenses 42, 42' of calcium fluorite sealing said aperture and being spaced from the object 7 by a rather narrow gap bridged over by a coating $i'$ of the "immersion" liquid mentioned above,— a magnifying lens 43, 43' arranged in the optical main axis of the container 40 for cooperation with said objective lens 42, 42' and— conventional means for withdrawing the air from said container indicated at 44'.

(4) Means for reproducing and rendering visible the magnified image are also enclosed in said secondary vacuum-tight container 40, which include:

(a) an electron-image tube responsive to ultra-violet light which is arranged in the optical main axis of the container 40 and corresponds functionally to tubes known in the art and being activated by infra-red light.

Said electron-image tube essentially consists of— (1) a curved photocathode 50 sensitive to and activated by the ultra-violet light image thrown thereupon by the magnifying lens 43, 43', of— (2) a plurality of annular electrodes 51 for collecting and accelerating the electrons emitted from the photocathode 50; said electrodes are coaxially arranged to the photocathode adjacently thereto and connected to different points of a potential dividing resistance 52, known in this art as "potentiometer," to which an electric high voltage current ranging near 2000 volts is supplied, and of— (3) electrostatic electron-converging lens in the form of an open ended substantially cylindrical electrode 53 energized by a high electrical potential, preferably ranging near 10,000 volts, for focusing the electron image projected by the photocathode 50; said converging lens 53 is formed with a recess 53' (Fig. 3) through which the image to be reproduced becomes visible to the operator;

(b) A non-translucent fluorescent screen 55, which is electron-sensitive at its upper side, apertured in its center, and coaxially arranged to the said electrostatic lens and magnifying lenses 53, 42, 42' therebetween, is provided for receiving the electron optical image projected thereupon;

(c) An observation window 56 is laterally provided in said secondary container 40, namely sealing a side outlet 57 of the latter, through which the electron-optical image can be directly seen; cross wires or like marks—not shown—may be conveniently provided at the photocathode 50 for facilitating the focusing of the object 7;

(d) A photographic plate holder diagrammatically shown at 60, 61 and having a shutter 62 may be also conveniently enclosed in the secondary container 40 for taking photographs of the ultra-violet light image produced by the magnifying lens 43, 43'; in the embodiment of the invention shown in Fig. 1 the said shutter 62 is stationarily fixed, while said plate holder 60, electrodes 51 and photocathode 50 are interconnected by means not shown so as to form a structural unit, and means are provided for displacing the latter relatively to the magnifying lens 43, 43' in a straight path of movement and in a direction perpendicular to the main axis of the microscope: The displacing means concerned comprise a rail track 65, upon which said unit is slidably mounted, and a rack and pinion gear 66, 67 attached to said plate holder 60 and being operable by a handle or knob 68 arranged on the outside of the container 40 and being rotatably mounted in a side wall of the latter.

The above described method of producing monochromatic ultra-violet light by means of a xenon vacuum discharge tube and a "Christiansen" filter is advantageous over that, wherein spark light is used, because the photo energy emitted from the xenon-tube is limited to ultra-violet light containing substantially only two yet intense spectral lines of 1295 A. U. and 1469 A. U., from which the more intense and powerful one (1469 A. U.) is selected as the working wave length of the instrument,— while spark light spectra usually contain a far greater number of lines and offer greater difficulties in selecting therefrom monochromatic light.

Various other changes and modifications may be conveniently made in the structural details of microscopes of the improved design described, wherein ultra-violet light of a reltaively short working wave length, ranging below the perviousness of air is used, without substantially departing from the spirit and the salient ideas of this invention.

The structurally modified instrument diagrammatically shown in Fig. 4 of the drawings comprises:

(1) Means for producing ultra-violet light and selecting therefrom monochromatic light of the working wave length specified which are symbolically indicated at 20', 30';

(2) A primary vacuum-tight container 10' having a system of monochromatic condenser lenses of calcium fluorite of which the upper lens 112 is opposed to and spaced from the lower side of the object 7' by a narrow gap bridged over by a coating $i$ of "immersion" liquid, referred to above;

(3) A secondary vacuum-tight container 40' having apertures at both ends thereof, an objective lens 142 which seals the lower aperture of the container 40' and is opposed to and spaced from the upper side of the object 7' by a narrow gap bridged over by another coating $i'$ of immersion liquid, and a transparent fluorescent screen 55' responsive to ultra-violet light; said screen 55' closes the upper aperture of the container 40' and is removably mounted thereon so as to be capable of being replaced by a photographic plate 61'; good results have been obtained with so-called "mono-crystal" fluorescent screens consisting of a layer of monoclinic-crystals.

Both containers 10' and 40' are connected through a system of pipes 14' with means for withdrawing the air therefrom, symbolically indicated by arrow 44";

(4) An eye piece diagrammatically shown at 70 and containing a system of magnifying lenses 71, 72, 73, 74 is adjustably associated by conventional means not shown with the secondary container 40' for observation of the magnified image visible on the fluorescent screen 55'.

Lithia-fluorite may be conveniently used as a substitute of calcium fluorite for making the various monochromatic lenses of the microscope, and the filter for the selection of monochromatic light.

Instead of xenon-gas or in addition thereto other inert gases—for instance crypton—may be used to advantage in the vacuum discharge tube concerned, which likewise emit bright spectral lines within the so-called "Schumann" field of the spectrum.

It is apparent that the means associated with the secondary container for reproducing and rendering visible the magnified object includes optical means whether it be the electronic means shown in Figs. 1 and 3 or the screen 55' or photographic plate 61' of Fig. 4.

I claim:

1. In a microscope of the refracting type, a source of light comprising a monochromatic ultra-violet light of a working wave length ranging below that pervious to air, a slide for carrying an object to be observed, an apertured primary vacuum tight container having a condenser lens located at an aperture adjacent the said slide interpositioned between the said source of light and the said slide, a secondary apertured vacuum tight container having an objective lens closing said container located adjacent the said slide but positioned on the opposite side of the said slide from the said primary container, means within the said secondary container to produce and magnify the image from the object carried by the said slide, electron means located structurally within the said secondary container to receive and reconvert the image rendering the said image visible to the human eye, an adjustable mounting for said slide, and an immersion liquid coating on both sides of the said slide having a refraction index pervious to the ultra violet light forming an air tight contact between the surfaces of the said slide and the condenser lens of the primary container and the objective lens of the secondary container, said slide being outside of the vacuum space of both said primary and said secondary containers.

2. In a microscope of the refracting type, a source of light comprising a monochromatic ultra-violet light of a working wave length ranging below that pervious to air, a slide for carrying an object to be observed, an apertured primary vacuum tight container having a condenser lens located at an aperture adjacent the said slide interpositioned between the said source of light and the said slide, a secondary apertured vacuum tight container having an objective lens closing said container located adjacent the said slide but positioned on the opposite side of the said slide from the said primary container, means within the said secondary container to produce and magnify the image from the object carried by the said slide, electron means located structurally within the said secondary container to receive and reconvert the image rendering the said image visible to the human eye, a fluorescent screen apertured at its center and arranged in the secondary chamber coaxially between said image receiving means and said objective lens, observation means structurally associated within said container for cooperation with said fluorescent screen, an adjustable mounting for said slide, and an immersion liquid coating on both sides of the said slide having a refraction index pervious to the ultra-violet light forming an air tight contact between the surfaces of the said slide and the condenser lens of the primary container and the objective lens of the secondary container, said slide being outside of the vacuum space of both said primary and said secondary containers.

3. In a microscope of the refracting type, a source of light comprising a monochromatic ultra-violet light of a working wave length ranging below that pervious to air, a slide for carrying an object to be observed, an apertured primary vacuum tight container having a condenser lens located at an aperture adjacent the said slide interpositioned between the said source of light and the said slide, a secondary apertured vacuum tight container having an objective lens closing said container located adjacent the said slide but positioned on the opposite side of the said slide from the said primary container, means within the said secondary container to produce and magnify the image from the object carried by the said slide, electron means located structurally within the said secondary container to receive and reconvert the image rendering the said image visible to the human eye, a fluorescent screen apertured at its center and arranged in the secondary chamber coaxially between said image receiving means and said objective lens, observation means structurally associated within said container for cooperation with said fluorescent screen, a photographic plate holder in said container, means for jointly displacing said plate holder and said image receiving and reconverting means transversely to the optical main axis of the microscope, an adjustable mounting for said slide, and an immersion liquid coating on both sides of the said slide having a refraction index pervious to the ultra violet light forming an air tight contact between the surfaces of the said slide and the condenser lens of the primary container and the objective lens of the secondary container, said slide being outside of the vacuum space of both said primary and said secondary containers.

4. In a microscope of the refracting type, a source of light comprising a monochromatic ultra-violet light of a working wave length ranging below that pervious to air, a slide for carrying an object to be observed, an apertured primary vacuum tight container having a condenser lens located at an aperture adjacent the said slide interpositioned between the said source of light and the said slide, a secondary apertured vacuum tight container having an objective lens closing one aperture in said container and which is located adjacent the said slide but positioned on the opposite side of the said slide from said primary container, optical means structurally associated with the said secondary container for reproducing and rendering visible the magnified object which has been illuminated with said light, and an eye piece for viewing the reproduced image, and an immersion liquid coating on both sides of the said slide having a refraction index pervious to the ultra-violet light forming an air tight contact between the surfaces of the said slide and the condenser lens of the primary container and the objective lens of the secondary container, said slide being outside of the vacuum space of both said primary and said secondary containers.

5. In a microscope of the refracting type, a source of light comprising a monochromatic ultra-violet light of a working wave length ranging below that pervious to air, a slide for carrying an object to be observed, an apertured primary vacuum tight container having a condenser lens located at an aperture adjacent the said slide interpositioned between the said source of light and the said slide, a secondary apertured vacuum tight container having an objective lens closing one aperture in said container and which is located adjacent the said slide but positioned on the opposite side of the said slide from said primary container, and said secondary container being further characterized by the fact that it has a second aperture adjacent its end farthest removed from said objective lens, a fluorescent screen structurally and removably associated with said secondary container for rendering visible a magnified image to the human eye, said screen being characterized by the fact that it is associated with said objective lens and constitutes a removable seal of said second aperture of said second container against the passage of air, an adjustable mounting for the said slide, and an eye piece for viewing the reproduced image, and an immersion liquid coating on both sides of the said slide having a refraction index pervious to the ultra-violet light forming an air-tight contact between the surfaces of the said slide and the condenser lens of the primary container and the objective lens of the secondary container, said slide being outside of the vacuum space of both said primary and said secondary containers.

6. In a microscope of the refracting type, a source of light comprising a monochromatic ultra-violet light of a working wave length ranging below that pervious to air, a slide for carrying an object to be observed, an apertured primary vacuum tight container having a condenser lens located at an aperture adjacent the said slide interpositioned between the said source of light and the said slide, a secondary apertured vacuum tight container having an objective lens closing one aperture in said container and which is located adjacent the said slide but positioned on the opposite side of the said slide from said primary container, and said secondary container being further characterized by the fact that it has a second aperture adjacent its end farthest removed from said objective lens, a sensitized plate structurally associated with said secondary container for reproducing the electron image, said sensitized plate being characterized by the fact that it is cooperatively associated with said objective lens, an adjustable mounting for said slide, and an eye piece for viewing the reproduced image, and an immersion liquid coating on both sides of the said slide having a refraction index pervious to the ultra-violet light forming an air-tight contact between the surfaces of the said slide and the condenser lens of the primary container and the objective lens of the secondary container, said slide being outside of the vacuum space of both said primary and said secondary containers.

7. In a microscope of the refracting type, a source of light comprising a monochromatic ultra-violet light of a working wave length ranging below that pervious to air, a slide for carrying an object to be observed, an apertured primary vacuum tight container having a condenser lens located at an aperture adjacent the said slide interpositioned between the said source of light and the said slide, a secondary apertured vacuum tight container having an objective lens closing one aperture in said container and which is located adjacent the said slide but positioned on the opposite side of the said slide from said primary container, and said secondary container being further characterized by the fact that it has a second aperture adjacent its end farthest removed from said objective lens, a fluorescent screen structurally and removably associated with said secondary container for rendering visible a magnified image to the human eye, said screen being characterized by the fact that it is associated with said objective lens and is adjacent said second aperture of said second container, an adjustable mounting for the said slide, and an eye piece for viewing the reproduced image, and an immersion liquid coating on both sides of the said slide having a refraction index pervious to the ultra-violet light forming an airtight contact between the surfaces of the said slide and the condenser lens of the primary container and the objective lens of the secondary container, said slide being outside of the vacuum space of both said primary and said secondary containers.

MANFRED von ARDENNE.